(12) United States Patent
Webster

(10) Patent No.: US 10,408,134 B2
(45) Date of Patent: Sep. 10, 2019

(54) GEARS, GEAR ARRANGEMENTS AND GAS TURBINE ENGINES

(71) Applicant: ROLLS-ROYCE plc, London (GB)

(72) Inventor: John R Webster, Derby (GB)

(73) Assignee: ROLLS-ROYCE PLC, London (GB)

( * ) Notice: Subject to any disclaimer, the term of this patent is extended or adjusted under 35 U.S.C. 154(b) by 513 days.

(21) Appl. No.: 15/155,700

(22) Filed: May 16, 2016

(65) Prior Publication Data

US 2016/0363056 A1 Dec. 15, 2016

(30) Foreign Application Priority Data

Jun. 11, 2015 (GB) .................... 1510171.0

(51) Int. Cl.
| | | |
|---|---|---|
| *F02C 7/36* | (2006.01) | |
| *F16H 55/12* | (2006.01) | |
| *F16H 55/17* | (2006.01) | |
| *F16H 1/28* | (2006.01) | |

(52) U.S. Cl.
CPC ................. *F02C 7/36* (2013.01); *F16H 1/28* (2013.01); *F16H 55/12* (2013.01); *F16H 55/17* (2013.01); *F05D 2260/40311* (2013.01)

(58) Field of Classification Search
CPC . F16H 1/28; F16H 55/17; F16H 55/12; F02C 7/36; F05D 2260/40311; F05D 55/17
USPC ................. 60/39.01; 74/431, 434, 446, 464
See application file for complete search history.

(56) References Cited

U.S. PATENT DOCUMENTS

| | | | | |
|---|---|---|---|---|
| 464,165 | A * | 12/1891 | Raymond, II | .......... F16H 55/06 74/446 |
| 1,424,203 | A * | 8/1922 | Keller | ..................... F16H 55/12 464/28 |
| 1,928,763 | A * | 10/1933 | Rosenberg | ................ F16D 3/76 29/450 |
| 2,187,706 | A * | 1/1940 | Julien | ....................... F16D 3/76 464/90 |
| 2,231,427 | A * | 2/1941 | Larsh | ................. B22D 19/0036 164/111 |
| 2,380,776 | A * | 7/1945 | Miller | ..................... F16H 55/14 74/443 |
| 2,704,465 | A * | 3/1955 | Haller | ...................... B22F 3/26 184/109 |

(Continued)

FOREIGN PATENT DOCUMENTS

| | | |
|---|---|---|
| DE | 10115356 A1 | 10/2002 |
| DE | 102009023720 A1 | 12/2010 |

(Continued)

OTHER PUBLICATIONS

Nov. 16, 2016 Search Report issued in European Patent Application No. 16169750.3.

(Continued)

*Primary Examiner* — J. Todd Newton
(74) *Attorney, Agent, or Firm* — Oliff PLC

(57) ABSTRACT

A gear including an inner bearing part; an outer part including a plurality of teeth; an intermediate part between the inner bearing part and the outer part, the intermediate part including a plurality of support members extending radially between the inner bearing part and the outer part, the plurality of support members being distributed along a longitudinal axis of the gear.

13 Claims, 4 Drawing Sheets

(56) References Cited

U.S. PATENT DOCUMENTS

| | | | | | |
|---|---|---|---|---|---|
| 2,730,795 | A | * | 1/1956 | Bloss | B21D 53/261 29/892.1 |
| 2,753,731 | A | * | 7/1956 | McWethy | F16D 3/76 464/89 |
| 2,756,607 | A | * | 7/1956 | Mochel | F16H 55/06 29/458 |
| 2,839,943 | A | * | 6/1958 | Hausmann | F16H 55/06 74/31 |
| 2,939,331 | A | * | 6/1960 | Weeks | F16H 55/14 74/443 |
| 3,216,267 | A | * | 11/1965 | Dolza | F16D 3/50 464/79 |
| 3,304,795 | A | * | 2/1967 | Rouverol | F16H 55/06 74/411 |
| 3,733,921 | A | * | 5/1973 | Carveth | F16H 55/06 29/893.37 |
| RE27,659 | E | * | 6/1973 | Wolfe et al. | B21D 53/26 148/528 |
| 4,118,848 | A | * | 10/1978 | Goldschmidt | B23P 15/14 228/170 |
| 4,134,308 | A | * | 1/1979 | Okano | F16H 55/14 165/8 |
| 4,674,351 | A | * | 6/1987 | Byrd | F16D 3/76 464/90 |
| 5,455,000 | A | * | 10/1995 | Seyferth | B22F 7/04 419/10 |
| 5,595,090 | A | * | 1/1997 | Moribayashi | F16H 1/28 475/901 |
| 5,722,295 | A | * | 3/1998 | Sakai | F16H 55/06 264/101 |
| 5,852,951 | A | * | 12/1998 | Santi | F16H 55/06 74/443 |
| 6,070,484 | A | * | 6/2000 | Sakamaki | B29D 15/00 264/328.1 |
| 6,274,074 | B1 | | 8/2001 | Monie | |
| 6,638,390 | B1 | * | 10/2003 | Sizelove | B29C 65/46 156/303.1 |
| 6,684,729 | B2 | * | 2/2004 | Bauseler | F16H 55/17 74/410 |
| 6,881,166 | B1 | * | 4/2005 | Burkhardt | B61B 12/02 474/166 |
| 8,448,771 | B2 | * | 5/2013 | Kuwashima | F16D 11/14 192/108 |
| 8,795,569 | B2 | * | 8/2014 | Oberle | F16H 55/06 264/261 |
| 10,005,161 | B2 | * | 6/2018 | Klein-Hitpass | B23P 15/14 |
| 10,107,384 | B2 | * | 10/2018 | Shah | F16H 3/663 |
| 10,151,383 | B2 | * | 12/2018 | Shah | F16H 57/082 |
| 2002/0043124 | A1 | * | 4/2002 | Shiga | B29C 45/16 74/434 |
| 2002/0139211 | A1 | * | 10/2002 | Ishizuka | F16H 55/17 74/437 |
| 2004/0187622 | A1 | * | 9/2004 | Noguchi | F16H 55/17 74/431 |
| 2004/0235610 | A1 | * | 11/2004 | Jang | F16H 57/082 475/331 |
| 2006/0275607 | A1 | * | 12/2006 | Demir | B22F 7/06 428/408 |
| 2010/0105515 | A1 | * | 4/2010 | Goleski | F16H 57/082 475/341 |
| 2010/0224020 | A1 | * | 9/2010 | Haussecker | F16H 55/17 74/425 |
| 2012/0237286 | A1 | | 9/2012 | Asakura et al. | |
| 2013/0130863 | A1 | * | 5/2013 | Xu | F16H 15/38 476/42 |
| 2015/0211623 | A1 | * | 7/2015 | Inui | F16H 55/30 474/152 |
| 2016/0298751 | A1 | * | 10/2016 | McCune | B22F 3/1055 |
| 2017/0252844 | A1 | * | 9/2017 | Hirono | B23K 1/18 |
| 2018/0031039 | A1 | * | 2/2018 | Nonato de Paula | F16C 33/4611 |
| 2018/0195559 | A1 | * | 7/2018 | Hallman | F16C 35/063 |

FOREIGN PATENT DOCUMENTS

| | | | | |
|---|---|---|---|---|
| DE | 102010054870 | A1 | 6/2012 | |
| DE | 102012102777 | A1 | 10/2013 | |
| DE | 102013017482 | A1 | 4/2015 | |
| FR | 2308842 | A1 | 11/1976 | |
| GB | 1541591 | A | 3/1979 | |
| WO | 2010/139298 | A1 | 12/2010 | |
| WO | WO 2010139298 | A1 * | 12/2010 | F16H 55/12 |
| WO | 2014/210462 | A1 | 12/2014 | |
| WO | WO 2014210462 | A1 * | 12/2014 | F16H 57/08 |

OTHER PUBLICATIONS

Dec. 2, 2015 Search Report issued in British Patent Application No. 1510171.0.

* cited by examiner

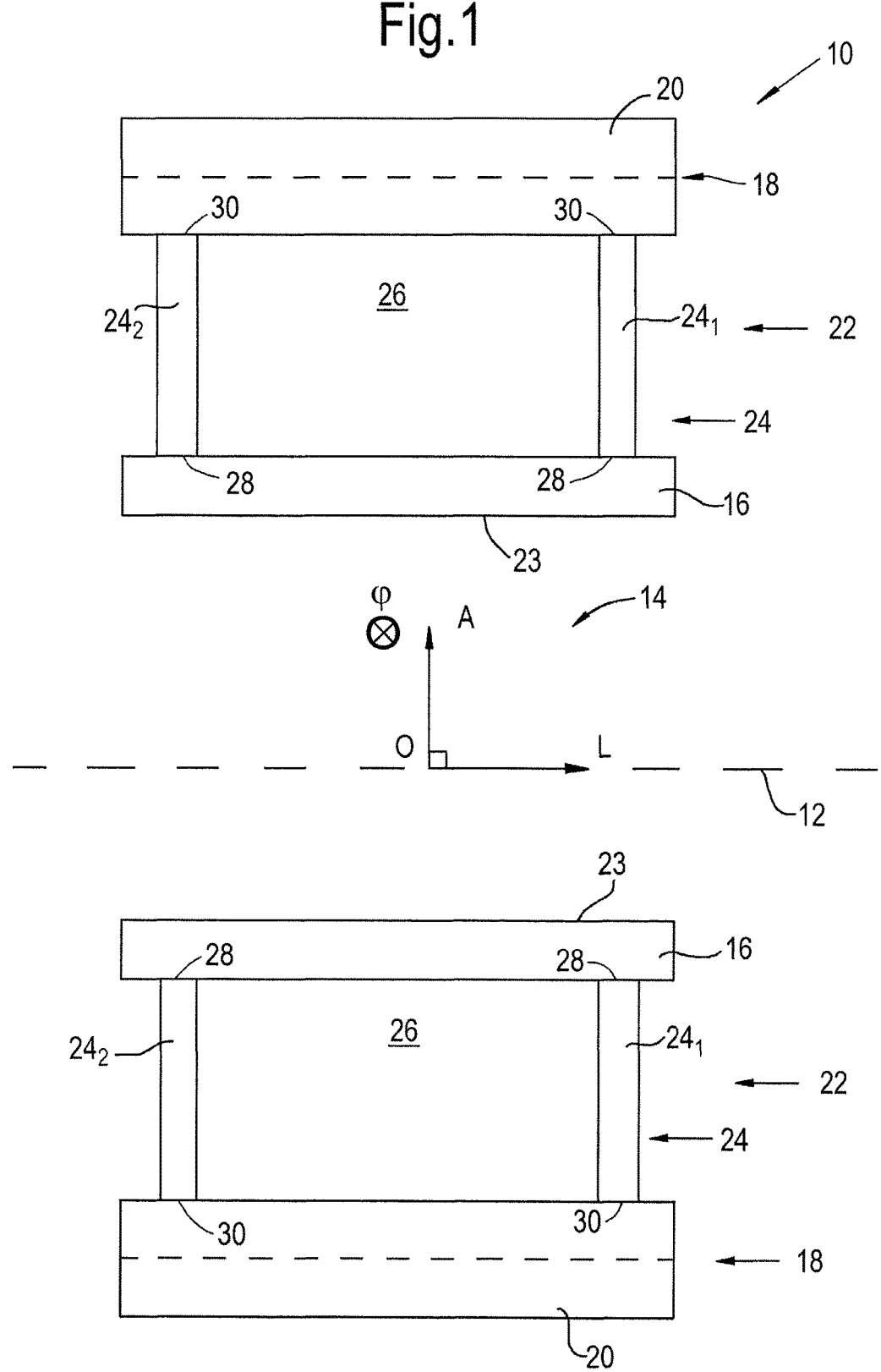

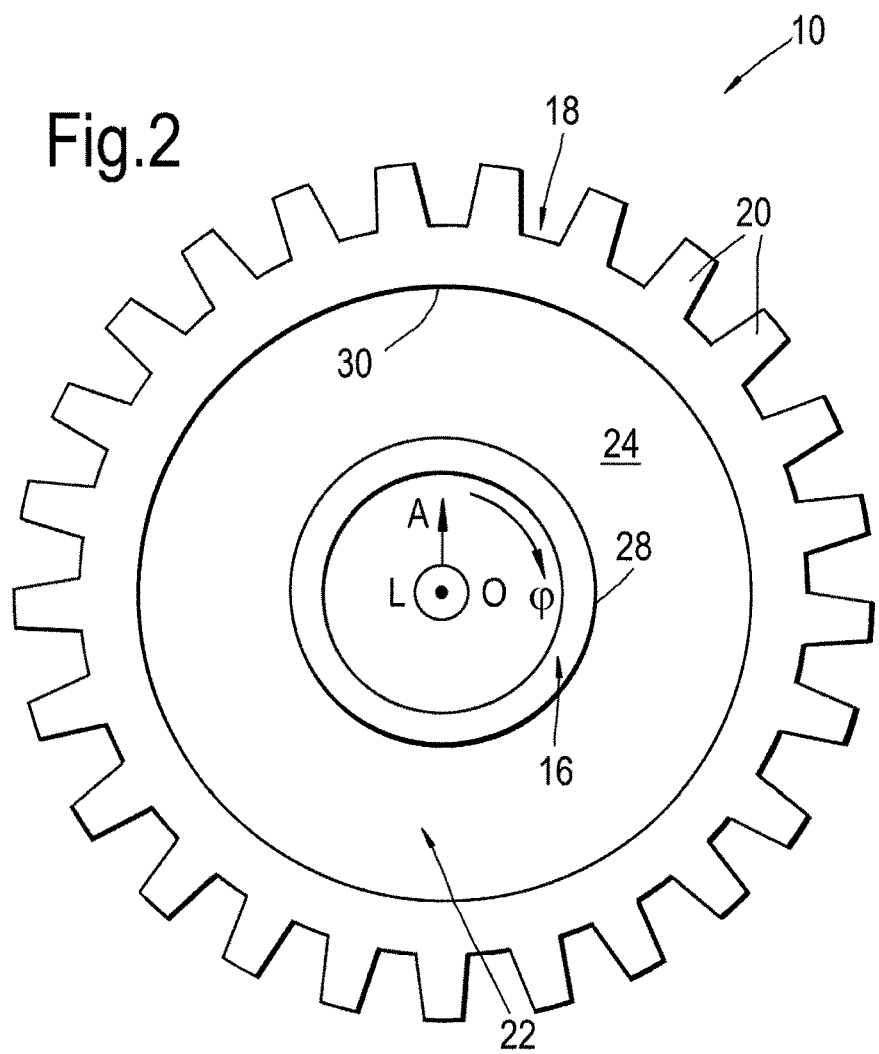
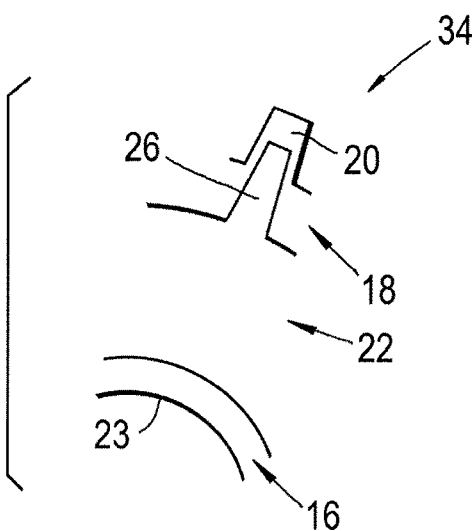

Fig.3
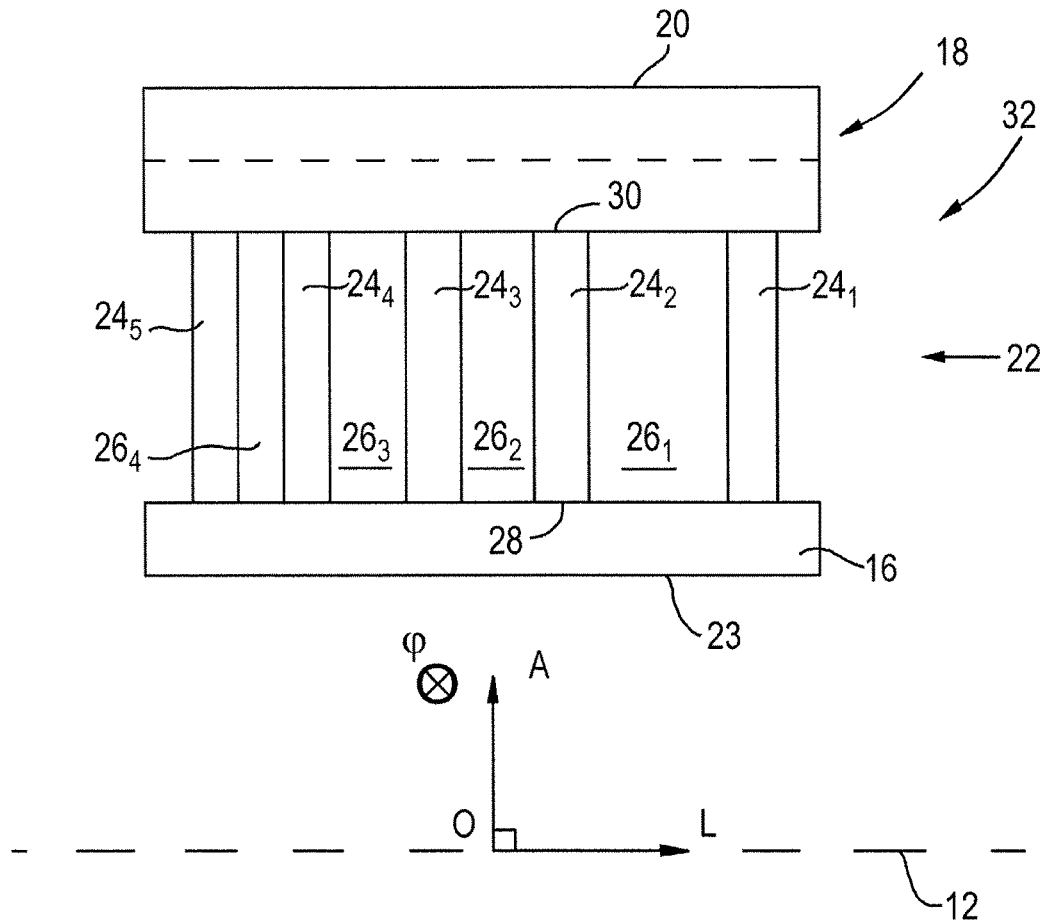
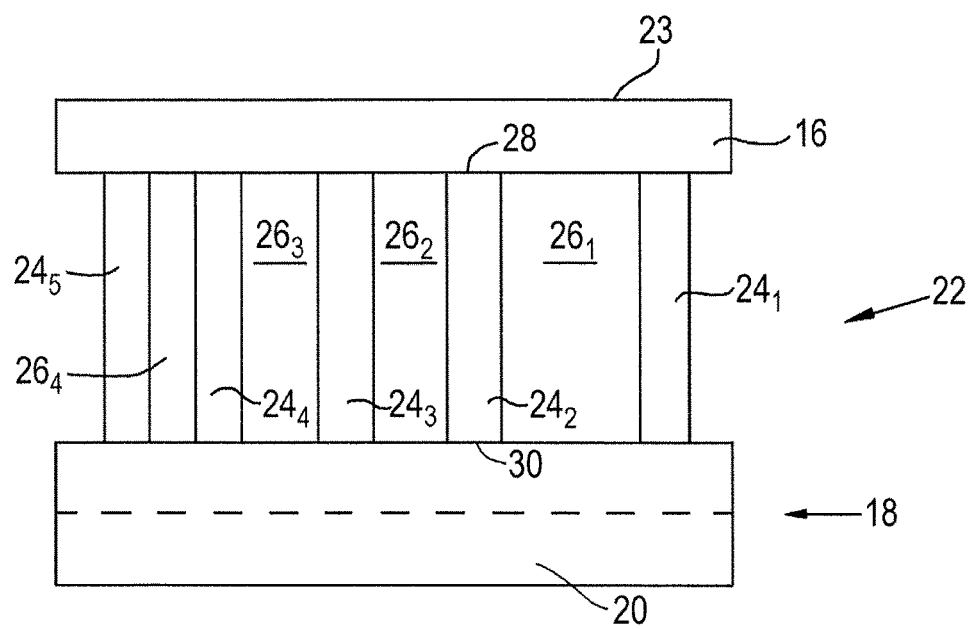

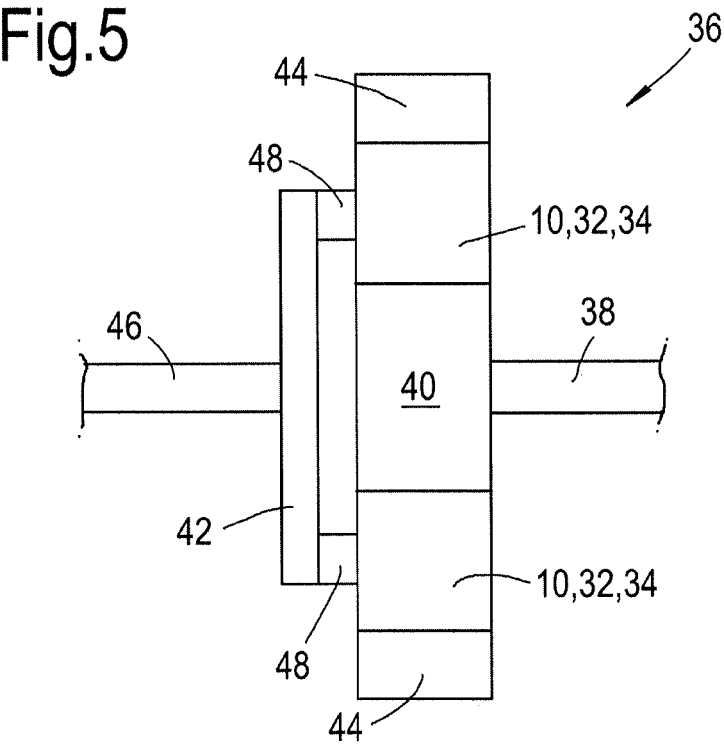
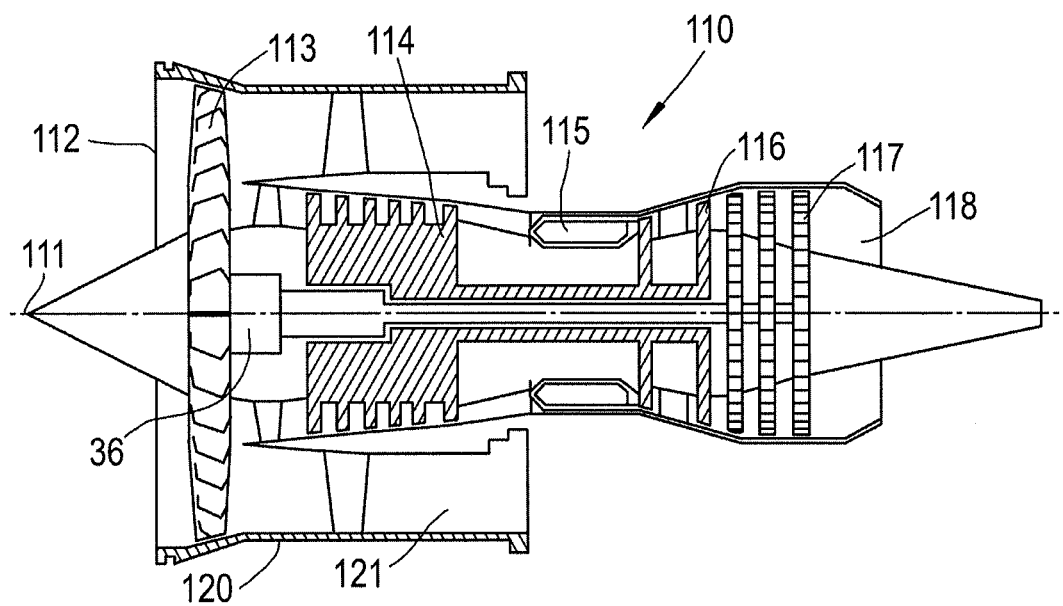

GEARS, GEAR ARRANGEMENTS AND GAS TURBINE ENGINES

TECHNOLOGICAL FIELD

The present disclosure concerns gears, gear arrangements and gas turbine engines.

BACKGROUND

Gears usually include a plurality of teeth for meshing with teeth on another part (such as another gear or a rack) and may provide a mechanical advantage through a gear ratio. In some gear arrangements, such as epicyclic gear arrangements, the mass and speed of a planet gear may cause relatively high centrifugal loading on the inner bearing surface of the gear. To reduce the centrifugal loading, the gear may be made thinner and therefore lighter. However, thinner gears are usually less stiff and this may lead to irregular loading on the inner bearing surface of the gear which may reduce the life of the gear.

BRIEF SUMMARY

According to various, but not necessarily all, embodiments there is provided a gear comprising: an inner bearing part; an outer part including a plurality of teeth; an intermediate part between the inner bearing part and the outer part, the intermediate part comprising a plurality of support members extending radially between the inner bearing part and the outer part, the plurality of support members being distributed along a longitudinal axis of the gear.

The inner bearing part, the intermediate part and the outer part may be integral to one another.

The inner bearing part and the intermediate part may be coupled to one another at a first interface.

The first interface may be a brazed joint, or a diffusion bonded joint, or a shrink fit joint, or an interference fit joint.

The intermediate part and the outer part may be coupled to one another at a second interface.

The second interface may be a brazed joint, or a diffusion bonded joint, or a shrink fit joint, or an interference fit joint.

The inner bearing part, the intermediate part and the outer part may comprise the same material.

The intermediate part may comprise a different material to the inner bearing part and/or the outer part.

A first support member of the plurality of support members may have a first axial position along the longitudinal axis, and a second support member of the plurality of support members may have a second axial position along the longitudinal axis, different to the first axial position, the first support member and the second support member may define a cavity there between.

The cavity may extend at least partially into at least one of the teeth of the plurality of teeth.

The intermediate part may have a closed cell structure, the plurality of support members may define at least a portion of the closed cell structure.

The closed cell structure of the intermediate part may have a honeycomb structure or a bone-like matrix structure.

The intermediate part may comprise a cylindrical sleeve defining a plurality of radial holes.

The intermediate part may be manufactured from a single object.

According to various, but not necessarily all, embodiments there is provided a gear arrangement comprising at least one gear as described in any of the preceding paragraphs.

The gear arrangement may be an epicyclic gear train, and the at least one gear may be arranged as a planet gear.

According to various, but not necessarily all, embodiments there is provided a gas turbine engine comprising a gear arrangement as described in any of the preceding paragraphs.

The gas turbine engine may further comprise: a fan; a compressor; a turbine; a shaft coupled to the compressor and to the turbine; the gear arrangement may be coupled to the shaft and to the fan.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION

Embodiments will now be described by way of example only, with reference to the Figures, in which:

FIG. 1 illustrates a cross sectional side view of a gear according to various examples;

FIG. 2 illustrates a cross sectional front view of the gear illustrated in FIG. 1;

FIG. 3 illustrates a cross sectional side view of another gear according to various examples;

FIG. 4 illustrates a cross sectional front view of another gear according to various examples;

FIG. 5 illustrates a cross sectional side view of a gear arrangement according to various examples; and FIG. 6 illustrates a cross sectional side view of a gas turbine engine according to various examples.

DETAILED DESCRIPTION

In the following description, the terms 'connected' and 'coupled' mean operationally connected and coupled. It should be appreciated that there may be any number of intervening components between the mentioned features, including no intervening components.

FIGS. 1 and 2 illustrate a gear 10 having a longitudinal axis 12, and a cylindrical coordinate system 14.

The cylindrical coordinate system 14 has an origin O, a polar axis A, a cylindrical axis L and an azimuth $\varphi$. The polar axis A, the cylindrical axis L and the azimuth $\varphi$ are orthogonal to one another. The longitudinal axis 12 of the gear 10 intersects the origin O of the cylindrical coordinate system 14. The cylindrical axis L of the cylindrical coordinate system 14 is parallel to, and extends along, the longitudinal axis 12.

The gear 10 may comprise any suitable material or materials. For example, the gear 10 may comprise one or more metal alloys comprising one or more of: steel; nickel; titanium; materials or metal matrix composites. Alternatively or additionally, the gear 10 may comprise a non-metallic material such as nylon or carbon fibre composites. The gear. 10 may be used in any suitable gear arrangement. For example, the gear 10 may be used as a sun gear or as a planet gear or as a ring gear in an epicyclic gear arrangement. The gear 10 may be used in a parallel shaft arrangement or in a bevel gear arrangement. The gear 10 includes an inner bearing part 16, an outer part 18 including a plurality of teeth 20, and an intermediate part 22 between the inner bearing part 16 and the outer part 18.

The inner bearing part 16 defines a bearing surface 23 for receiving a shaft and a rolling element (not illustrated in FIGS. 1 and 2). As illustrated in FIG. 1, the inner bearing part 16 and the bearing surface 23 are positioned radially outwards from the longitudinal axis 12 and extend along the cylindrical axis L. In this example, the inner bearing part 16 is oriented parallel to the cylindrical axis L. As illustrated in FIG. 2, the inner bearing part 16 extends around the longitudinal axis 12 parallel to the azimuth φ and thus defines a circular ring.

As illustrated in FIG. 1, the outer part 18 is positioned radially outwards from the longitudinal axis 12 and extends along the cylindrical axis L. As illustrated in FIG. 2, the outer part 18 extends around the longitudinal axis 12 parallel to the azimuth φ and thus also defines a circular ring. The teeth 20 are configured to engage teeth on another part. For example, where the gear 10 is a planet gear in an epicyclic gear arrangement, the teeth 20 are configured to engage teeth of a sun gear and a ring gear.

The intermediate part 22 comprises a plurality of support members 24 that extend radially between the inner bearing part 16 and the outer part 18. In some examples, at least one of the support members 24 is directly connected to the inner bearing part 16 and to the outer part 18. In other examples, at least one of the support members 24 is connected to the inner bearing part 16 and/or the outer part 18 via an intervening member (such as a ring between the inner bearing part 16 and the outer part 18).

The plurality of support members 24 are distributed along the longitudinal axis 12 of the gear 10 and define at least one cavity there between. The support members 24 may comprise any suitable structure. For example, a support member 24 may have a disc shape and may not be directly connected to other support members 24 (as illustrated in FIGS. 1 and 2). In other examples, a support member 24 may define one or more apertures (which may be blind apertures or through apertures) and may be directly connected to one or more other support members. In some examples, the plurality of support members 24 may define a closed cell structure such as a honeycomb structure, or a bone-like matrix structure (where the plurality of support members 24 form part of the closed cell structure). The support member 24 may be manufactured from a single object (that is, from a single piece of material) such as a cylindrical sleeve where radial holes are machined into the cylindrical sleeve to define cavities when the gear 10 is assembled. The radial holes may be through holes or may be blind holes.

By way of an example, a first support member $24_1$ of the plurality of support members 24 has a first axial position along the longitudinal axis 12, and a second support member $24_2$ of the plurality of support members 24 has a second axial position along the longitudinal axis that is different to the first axial position. The first axial position may be located at the front face of the gear 10 (that is, at the front edge of the inner bearing part 16 and the outer part 18), or may be located at any location between the front and back faces of the gear 10. Similarly, the second axial position may be located at the back face of the gear 10 (that is, at the back edge of the inner bearing part 16 and the outer part 18), or may be located at any location between the front and back faces of the gear 10. The first support member $24_1$ and the second support member $24_2$ define a cavity 26 there between.

The inner bearing part 16, the intermediate part 22 and the outer part 18 may be integral to one another. For example, the inner bearing part 16, the intermediate part 22 and the outer part 18 may be manufactured via additive layer manufacturing (which may also be referred to as three dimensional printing) and may therefore not have joining interfaces.

Alternatively, the inner bearing part 16 and the intermediate part 22 may be coupled to one another at a first interface 28. The first interface 28 may be a diffusion bonded joint where diffusion bonding is performed (for example) by starting with a hot worked steel with a grain size of ten to twenty micrometers. Then, the inner bearing part 16 and the intermediate part 22 are diffusion bonded at approximately 700 Celsius under 2.5 MPa surface pressure for 30 minutes. The inner bearing part 16 and the intermediate part 22 are then annealed at approximately 800 Celsius for a few hours. The coupled inner bearing part 16 and the intermediate part 22 are then machined, hardened and tempered as desired. In other examples, the first interface 28 may be a brazed joint, a shrink fit joint or an interference fit joint.

Additionally or alternatively, the intermediate part 22 and the outer part 18 may be coupled to one another at a second interface 30. The second interface 30 may be a diffusion bonded joint (which may be formed as described in the process in the preceding paragraph), a brazed joint, a shrink fit joint or an interference fit joint.

In some examples, the inner bearing part 16, the intermediate part 22 and the outer part 18 may comprise the same material. For example, the inner bearing part 16, the intermediate part 22 and the outer part 18 may comprise the same steel alloy. In other examples, the intermediate part 22 may comprise a different material to the inner bearing part 16 and/or the outer part 18. For example, the intermediate part 22 may comprise a different steel alloy to the inner bearing part 16 and the outer part 18. The inner bearing part 16 and the outer part 18 may comprise the same material, or a different material.

FIG. 3 illustrates a cross sectional side view of another gear 32 according to various examples. The gear 32 is similar to the gear 10 and where the features are similar, the same reference numerals are used. The gear 32 differs from the gear 10 in that the intermediate part 22 comprises more than two support members 24 and more than one cavity 26.

In more detail, the intermediate part 22 includes a first support member $24_1$, a second support member $24_2$, a third support member $24_3$, a fourth support member $24_4$ and a fifth support member $24_5$ that are distributed along the longitudinal axis 12 and extend between the inner bearing part 16 and the outer part 18. The first support member $24_1$ and the second support member $24_2$ define a first cavity $26_1$ there between, the second support member $24_2$ and the third support member $24_3$ define a second cavity $26_2$ there between, the third support member $24_3$ and the fourth support member $24_4$ define a third cavity $26_3$ there between, and the fourth support member $24_4$ and the fifth support member $24_5$ define a fourth cavity $26_4$ there between.

At least some of the first support member $24_1$, the second support member $24_2$, the third support member $24_3$, the fourth support member $24_4$ and the fifth support member $24_5$ may be irregularly spaced along the longitudinal axis 12 of the gear 32. For example (and as illustrated in FIG. 3), the first cavity $26_1$ defined between the first support member $24_1$ and the second support member $24_2$ has a greater depth (that is, distance along the cylindrical axis L) than the fourth cavity $26_4$ defined between the fourth support member $24_4$ and the fifth support member $24_5$.

In other examples, the first support member $24_1$, the second support member $24_2$, the third support member $24_3$, the fourth support member $24_4$ and the fifth support member $24_5$ may be regularly spaced along the longitudinal axis 12 of the gear 32. That is, the depth of each of the cavities 26$_1$, 26$_2$, 26$_3$, 26$_4$ may be the same as one another.

FIG. 4 illustrates a cross sectional front view of a part of another gear 34 according to various examples. The gear 34 is similar to the gears 10, 32 and where the features are similar, the same reference numerals are used. The gear 34 differs in that the cavity 26 extends at least partially into at least one of the teeth of the plurality of teeth 20. Where the gear 34 defines a plurality of cavities (as illustrated in FIG. 3 for example), one or more of the cavities may extend at least partially into at least one of the teeth of the plurality of teeth 20. It should be appreciated that where the intermediate part 22 comprises a closed cell structure (such as a honeycomb structure), the closed cell structure may extend at least partially into at least one of the teeth of the plurality of teeth 20.

The gear 10, 32, 34 may provide several advantages. In particular, the gear 10, 32, 34 may have a relatively low mass and a relatively high rigidity against bending. This may reduce distortion of the teeth 20 and the inner bearing surface 23 when the gear 10, 32, 34 is in operation within a gear arrangement.

FIG. 5 illustrates a cross sectional side view of a gear arrangement 36 according to various examples. The gear arrangement 36 is an epicyclic gear train comprising an input shaft 38, a sun gear 40, a plurality of planet gears (which may include any one or combination of the gears 10, 32, 34), a planet carrier 42, a ring gear 44 and an output shaft 46. It should be appreciated that in other examples, the gear arrangement 36 may not be an epicyclic gear train and may have an alternative structure.

The input shaft 38 is coupled to the sun gear 40 and the plurality of planet gears 10, 32, 34 are coupled to the planet carrier 42 via shafts 48. The planet carrier 42 is coupled to the output shaft 46. The sun gear 40 is positioned at the centre of the ring gear 44 and the plurality of planet gears 10, 32, 34 are positioned between (and mesh with) the sun gear 40 and the ring gear 44.

In operation, torque may be applied to the input shaft 38 to rotate the sun gear 40. The sun gear 40 applies torque to the plurality of planet gears 10, 32, 34 which then rotate around the sun gear 40 (that is, the plurality of planet gears 10, 32, 34 orbit the sun gear 40) and within the ring gear 44 (which is non-rotatable). The rotation of the plurality of planet gears 10, 32, 34 causes rotation of the planet carrier 42 and the transfer of torque to the output shaft 46.

The plurality of planet gears 10, 32, 34 may advantageously reduce centrifugal loading on the inner bearing surface 23 of the planet gears 10, 32, 34 when rotated about the sun gear 40 due to their relatively low mass. This may reduce wear of the inner bearing surface 23 and thus increase the operational life of the gear arrangement 36.

The epicyclic gearbox illustrated in FIG. 5 may also be operated as a spur gearbox where the input is shaft 38, but the planet carrier 42 is held stationary (that is, the planet carrier 42 is non-rotatable) and the output is taken from the ring gear 44.

FIG. 6 illustrates a cross sectional side view diagram of a gas turbine engine 110 having a principal and rotational axis 111. The gas turbine engine 110 comprises, in axial flow series, an air intake 112, a propulsive fan 113, a high-pressure compressor 114, combustion equipment 115, a high-pressure turbine 116, a low-pressure turbine 117 and an exhaust nozzle 118. A nacelle 120 generally surrounds the gas turbine engine 110 and defines the intake 112.

The gas turbine engine 110 operates so that air entering the intake 112 is accelerated by the fan 113 to produce two air flows: a first air flow into the high-pressure compressor 114 and a second air flow which passes through a bypass duct 121 to provide propulsive thrust. The high-pressure compressor 114 compresses the air flow directed into it before delivering that air to the combustion equipment 115.

In the combustion equipment 115, the air flow is mixed with fuel and the mixture combusted. The resultant hot combustion products then expand through, and thereby drive the high and low-pressure turbines 116, 117 before being exhausted through the nozzle 118 to provide additional propulsive thrust. The high 116 and low 117 pressure turbines drive respectively the high pressure compressor 114 and the fan 113, each by suitable interconnecting shafts.

The gas turbine engine 110 comprises a gear arrangement 36 (which may also be referred to as a gearbox) provided in the drive train from the low pressure turbine 117 to the fan 113. The gear arrangement 36 is positioned within the gas turbine engine 10 so that the longitudinal axis 12 of the planet gears 10, 32, 34 are oriented parallel to the rotational axis 111 of the gas turbine engine 110. In other examples, the gear arrangement 36 may be provided in the drive train from the low pressure turbine 117 to a compressor (such as a 'booster' compressor positioned between the fan 113 and the high pressure compressor 114).

Other gas turbine engines to which the present disclosure may be applied may have alternative configurations. By way of an example, such gas turbine engines may have an alternative number of interconnecting shafts (for example, three or more interconnecting shafts) and/or an alternative number of compressors and/or turbines.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

What is claimed is:

1. A gear comprising:
an inner bearing part;
an outer part including a plurality of teeth; and
an intermediate part between the inner bearing part and the outer part, the intermediate part comprising a plurality of support members extending radially between the inner bearing part and the outer part, the plurality of support members being distributed along a longitudinal axis of the gear,
wherein:
a first support member of the plurality of support members has a first axial position along the longitudinal axis,
a second support member of the plurality of support members has a second axial position along the longitudinal axis, different from the first axial position, the first support member and the second support member defining a first cavity therebetween,
a third support member of the plurality of support members has a third axial position along the longitudinal axis, different from the first axial position and the second axial position, the second support member and the third support member defining a second cavity therebetween, and
the first cavity is longer than the second cavity along the longitudinal axis.

2. The gear as claimed in claim 1, wherein the intermediate part comprises a different material than the inner bearing part and/or the outer part.

3. The gear as claimed in claim 1, wherein the inner bearing part, the intermediate part and the outer part are integral to one another.

4. The gear as claimed in claim 1, wherein the inner bearing part and the intermediate part are coupled to one another at a first interface.

5. The gear as claimed in claim 4, wherein the first interface is a brazed joint, or a diffusion bonded joint, or a shrink fit joint, or an interference fit joint.

6. The gear as claimed in claim 1, wherein the intermediate part and the outer part are coupled to one another at a second interface.

7. The gear as claimed in claim 6, wherein the second interface is a brazed joint, or a diffusion bonded joint, or a shrink fit joint, or an interference fit joint.

8. The gear as claimed in claim 1, wherein the first cavity or the second cavity extends at least partially into at least one of the teeth of the plurality of teeth.

9. The gear as claimed in claim 1, wherein the intermediate part has a closed cell structure, the plurality of support members defining at least a portion of the closed cell structure.

10. A gear arrangement comprising at least one gear as claimed in claim 1.

11. The gear arrangement as claimed in claim 10, wherein the gear arrangement is an epicyclic gear train, and the at least one gear is arranged as a planet gear.

12. A gas turbine engine comprising the gear arrangement as claimed in claim 10.

13. The gas turbine engine as claimed in claim 12, further comprising: a fan; a compressor; a turbine; a shaft coupled to the compressor and to the turbine; the gear arrangement being coupled to the shaft and to the fan.

* * * * *